US006636885B1

(12) United States Patent
Martin (10) Patent No.: US 6,636,885 B1
(45) Date of Patent: Oct. 21, 2003

(54) SYSTEM USING INTERFACE CLASS IN CLIENT COMPUTER TO RESOLVE REFERENCES AND RETRIEVE DELAYED CLASS APPLET FROM SERVER

(75) Inventor: Guy Martin, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/276,824

(22) Filed: Mar. 26, 1999

(51) Int. Cl.$^7$ .................. G06F 15/16; G06F 15/167
(52) U.S. Cl. ................. 709/202; 709/216; 709/232; 709/229
(58) Field of Search ................. 709/202, 216, 709/232, 222, 229, 227, 310, 313, 317; 717/1; 707/500; 711/148

(56) References Cited

U.S. PATENT DOCUMENTS

| | | | | |
|---|---|---|---|---|
| 5,655,101 A | * | 8/1997 | O'Farrell et al. | 711/148 |
| 5,737,619 A | * | 4/1998 | Judson | 707/500 |
| 5,958,013 A | * | 9/1999 | King et al. | 709/227 |
| 6,272,674 B1 | * | 8/2001 | Holiday, Jr. | 717/1 |

OTHER PUBLICATIONS

E. Gamma et al., "Design Patterns Elements of Reusable Object–Oriented Software," Addison–Wesley, pp. 207–217 (1995).

James Gosling et al., "The Java™ Language Specification," XP 002042923, Chapter 12, Execution, pp. 215–236 (Aug. 1996).

Mark Nelson, "Java and the Zip File Format," XP–000938049, Dr. Dobb's Journal, pp. 51–54; p. 102 (Dec. 1997).

* cited by examiner

Primary Examiner—Le Hien Luu
(74) Attorney, Agent, or Firm—Finnegan, Henderson, Farabow, Garrett & Dunner, L.L.P.

(57) ABSTRACT

A method and system is provided for delaying the loading of classes that are unnecessary the start-up of an applet when a server sends an applet to a client. Methods and systems consistent with the present invention package the class files necessary for start-up of the applet on the client in a single archive file along with relatively small interface classes that reference the delayed classes This archive file, being smaller, saves download time and can be sent with a single connection from the server computer to the client computer, as opposed to multiple connections. These methods and systems consistent with the present invention also provide a way for the client computer to request the delayed classes not included in the initial archive file if the delayed class is later needed by the client computer.

13 Claims, 6 Drawing Sheets

SYSTEM USING INTERFACE CLASS IN CLIENT COMPUTER TO RESOLVE REFERENCES AND RETRIEVE DELAYED CLASS APPLET FROM SERVER

BACKGROUND

1. Field of the Invention

The present invention relates generally to a data processing system and, more particularly, to a method and system for delaying class loading using interface stubs.

2. Related Art

Many computing systems use object-oriented programming to better accommodate the increasing complexity and cost of large computer programs. In an object-oriented system, a "class" provides a template for the creation of "objects," instances of the class, and an object includes data members and function members (methods).

In network environments, a client computer may use data obtained remotely from one or more server computers. This data is typically sent from the server computer to the client computer via a network, such as the Internet, a wide area network (WAN), or a local area network (LAN). When a client program on the client computer accesses the server computer for data, one conventional way of sending the information from the server computer to the client computer is through the use of applets, such as Java™ applets. An applet is software that may, for instance, run inside a Web Browser on a client computer. Conventional applets may comprise a collection of classes and objects. These classes may, for example, establish a user interface screen on the client computer, so that the user may then use and view the data sent by the server computer.

Typically, an applet comprises multiple compiled classes, which are created from source files created by a user and written in a programming language, such as the Java™ programming language further described in "The Java™ Language Specification," James Gosling, Bill Joy, Guy Steele, Addison-Wesley, 1996. Java is a trademark of Sun Microsystems, Inc. A compiler compiles the user-created source files to create the compiled classes which form the applet on the server computer.

When the client computer receives the applet from the server computer, the applet's compiled classes may be run by an execution environment, such as the Java™ Virtual Machine, a well-known execution vehicle for computer programs described in greater detail in Lindholm and Yellin, "The Java Virtual Machine Specification," Addison-Wesley, 1996.

Large applets typically suffer from download performance problems, since each class in the applet has to be downloaded to the client computer or Web browser in a separate Hyper Text Transfer Protocol (HTTP) connection, a typical Internet communication protocol. Establishing and utilizing many of these connections can be a slow process on a traditional modem line. Conventional methods attempt to remedy this problem by packaging the classes in a single archive file. These conventional methods typically place the classes in a "ZIP" file or Java™ archive file, referred to as a "JAR" file. By placing the applet classes in an archive file, the classes can be sent from the server computer to the client computer in one HTTP connection, thereby reducing the delay associated with obtaining multiple HTTP connections. However, if the number and size of the class files in the archive file is large, this conventional approach still suffers from performance problems. For example, if the applet archive file is large, the size of the applet archive file alone may cause a significant delay during the downloading process. Accordingly, it is desirable to improve the downloading process.

SUMMARY

Methods and systems consistent with the present invention avoid these and other problems by enabling faster downloads of applets by delaying the loading of classes not immediately necessary for the start-up of an applet. To accomplish this goal, only classes necessary for start-up and interfaces to the delayed classes are initially passed to a client computer or Web browser. Thus, the amount of information transferred to the client computer is reduced over conventional systems, requiring less time to download. By transferring interfaces to the delayed classes, the client computer is tricked into believing that it received the entire applet. The delayed classes, the classes not initially sent, may be downloaded during the running of the applet on the client computer when they are needed, thus deferring the associated processing until necessary, which reduces the time required to perform the initial download and which avoids unnecessary processing in the event that the class is never invoked.

The advantages accruing to the present invention are numerous. Methods and systems consistent with the present invention limit the size of an archive file containing applet files by only including necessary start-up files. As a result, the smaller size of the archive file reduces the delay associated with sending the applet. Small interface references to the delayed classes are included in the archive file, and they allow the client computer to verify receipt of the entire applet. Referred to as interface "stubs," these references provide a way for the delayed classes to be requested by the client computer if needed during the running of the applet. Additionally, methods and systems consistent with the present invention send one archive file and therefore eliminate the need for multiple connections to handle multiple exchanges of classes between the server computer and client computer.

In accordance with the present invention, a method is provided for sending an applet from a server computer to a client computer. This method determines a first class to be delayed on the server computer, the first class being unnecessary for start-up of the applet. It creates an interface class for the first class, wherein the interface class provides sufficient information to resolve references found in the first class, and creates on the server computer an archive file that represents the applet and that contains the interface class. This method then sends the archive file from the server computer to the client computer such that the client computer uses the interface class to resolve the references to the first class when starting the applet.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Methods and systems consistent with the present invention provide an improved download system that delays the loading of classes that are unnecessary to the start-up of an applet, such as a Java™ applet, when a server computer sends the applet to a client computer. This download system generally packages the classes necessary for start-up of the applet in a single archive file, along with relatively small interface "stubs" that reference the delayed classes not initially sent. Avoiding the use of multiple connections, this archive file can be sent with a single HTTP connection from the server computer to the client computer. The download system also provides a way for the client computer to request any delayed class not included in the initial archive file if the delayed class is needed by the client computer during running of the received applet.

Generally, the download system selects the classes to be delayed by deciding which classes are essential for the start-up of the applet on the client computer. For each delayed class, the download system creates an interface stub that references the corresponding delayed class, and this stub is usually much smaller than the delayed class it references. For an applet to run, the client computer verifies access to every class in the applet. The interface stubs allow the client computer to verify receipt of the applet. During running of the applet, if the client computer needs to run a class that was delayed, the download system determines if the class is currently loaded in memory, and if it is not, the delayed class is downloaded to the client.

Figure 1:
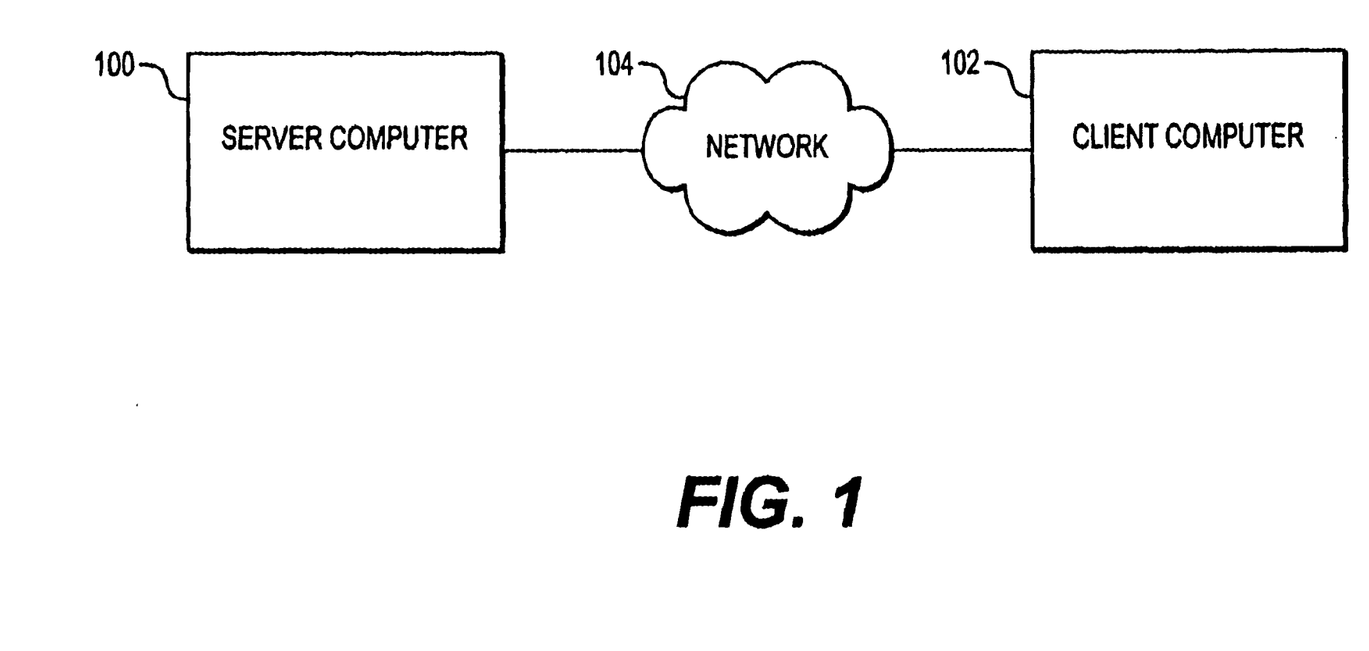
FIG. 1 is a block diagram of a client computer and server computer connected to a network in accordance with the present invention.

FIG. 1 shows a data processing system suitable for use with methods and systems consistent with the present invention with a server computer 100 and a client computer 102 connected via a network 104, such as the Internet, a WAN or a LAN. Typically, client computer 102 receives data such as an applet from server computer 100. Although two computers are shown in FIG. 1, one skilled in the art will recognize that the network 104 may include many more computers. Furthermore, server computer 100 may also act as a client computer and receive data from any other computer connected to network 104, and similarly, client computer 102 may also act as a server computer and send data to other computers connected to network 104.

Figure 2A:
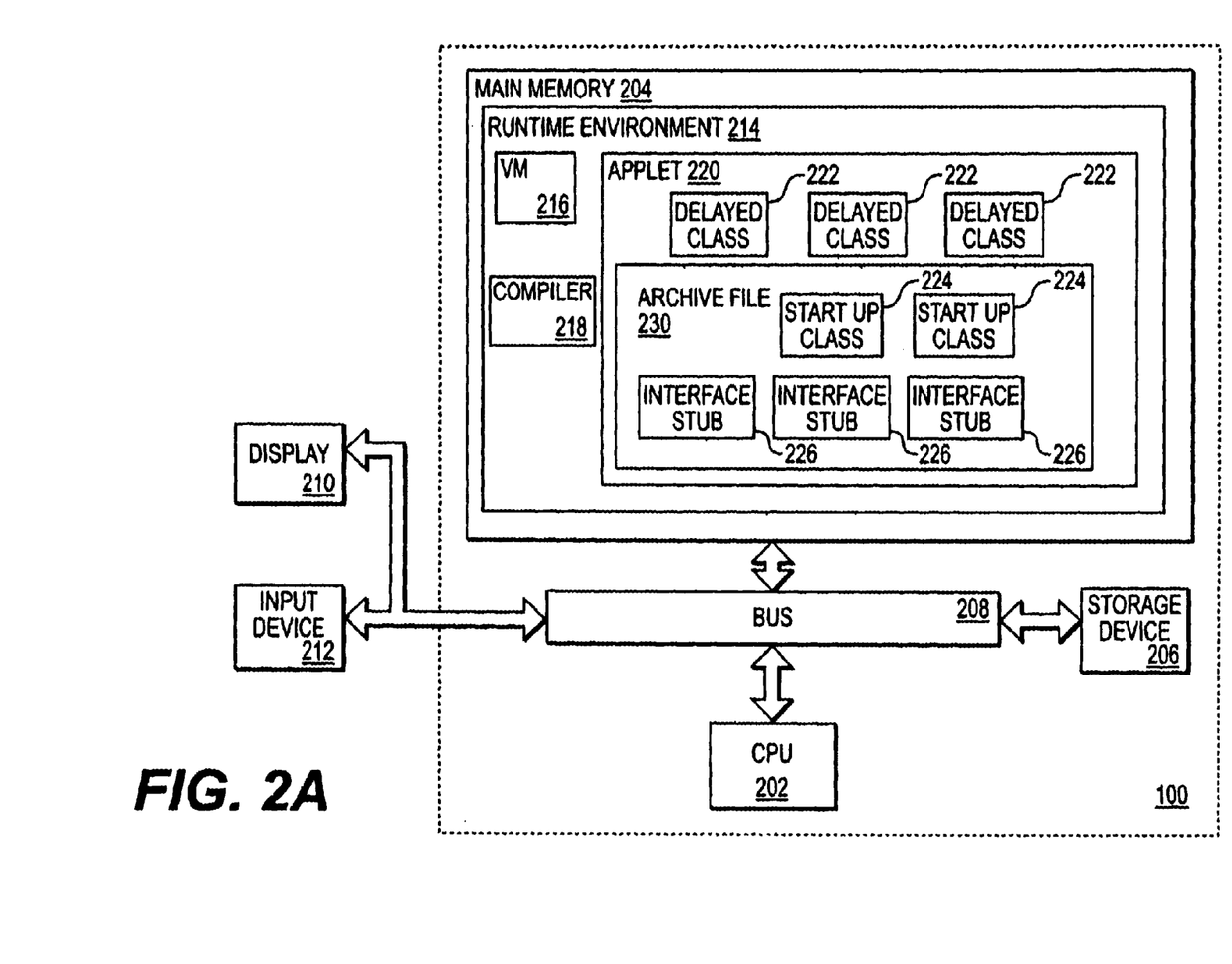
FIGS. 2A and 2B are detailed block diagrams of a server computer and client computer, respectively, in accordance with the present invention.

FIG. 2A depicts a more detailed block diagram of a server computer 100. Server computer 100 includes a central processing unit (CPU) 202, a main memory 204, and a secondary storage device 206 interconnected via bus 208. Additionally, server computer 100 includes a display 210, and an input device 212. The main memory 204 contains a runtime environment 214, such as a Java Runtime Environment, that also contains a virtual machine (VM) 216 such as the Java™ Virtual Machine (JVM), and a compiler 218, such as a Java™ Compiler. The compiler 218 compiles source code entered by a user or other application, and the Java™ Virtual Machine is a well-known execution vehicle for computer programs and is described in greater detail in Lindholm and Yellin, "The Java Virtual Machine Specification," Addison-Wesley, 1996, which is incorporated herein by reference.

One skilled in the art will appreciate that the source code (not shown), classes and other aspects of methods and systems consistent with the present invention may be stored on or read from other computer readable media besides memory like secondary storage devices, such as hard disks, floppy disks, and CD ROM, or a carrier wave from a network such as the Internet. Although the applet is described as operating in a VM, one skilled in the art will appreciate that the applet may operate in other programs and may operate in other object-oriented or non-object-oriented programming environments. Additionally, one skilled in the art will also appreciate that the computer system may contain additional or different components.

FIG. 2A further details components of the memories and programming environments of a server computer 100 in one implementation consistent with the present invention. Shown on the server computer 100 is an applet 220, such as a Java™ applet, which contains classes to be run by the client computer 102. Consistent with the present invention, there are delayed classes 222 and start-up classes 224 in the applet 220. The delayed classes 222 are classes in the applet 220 that do not need to be sent initially to start up the applet 220 on the client computer 102. These delayed classes 222 may later be called upon by the client computer 102 while running the applet 220, but are unnecessary to the initial running of the applet 220. Start-up classes 224, on the other hand, are classes that are necessary to the initial running of the applet 220 on the client computer 102.

For each delayed class 222, there is an interface class, referred to as an interface stub 226, that is a list of methods and variables associated with the delayed class. Each interface stub 226 is used to reference a delayed class 222 that is not initially sent to the client. Only containing a list of methods and variables, these interface stubs 226 are much smaller and take a much less memory than the classes 222 to which they refer. For example, an interface stub 226 may typically be on the order of a couple hundred bytes, while the delayed classes 222 may typically be on the order of several thousand bytes. The interface stubs 226 contain enough information so that the verifier 228, discussed below, on the client computer 102 can verify the delayed classes 222 without actually loading them.

In one implementation, the start-up classes 224 and interface stubs 226 are placed in an archive file 230, such as a JAR or ZIP file, that is sent from the server computer 100 to the client computer across network 104. The sending of an archive file 230 instead of individual classes allows the applet 220 to be sent with one HTTP connection, as opposed to multiple HTTP connections, thereby saving time. The Java compiler 218 compiles all of the classes (222 and 224) and interface stubs 226 before they are put into the archive file 230.

Figure 2B:
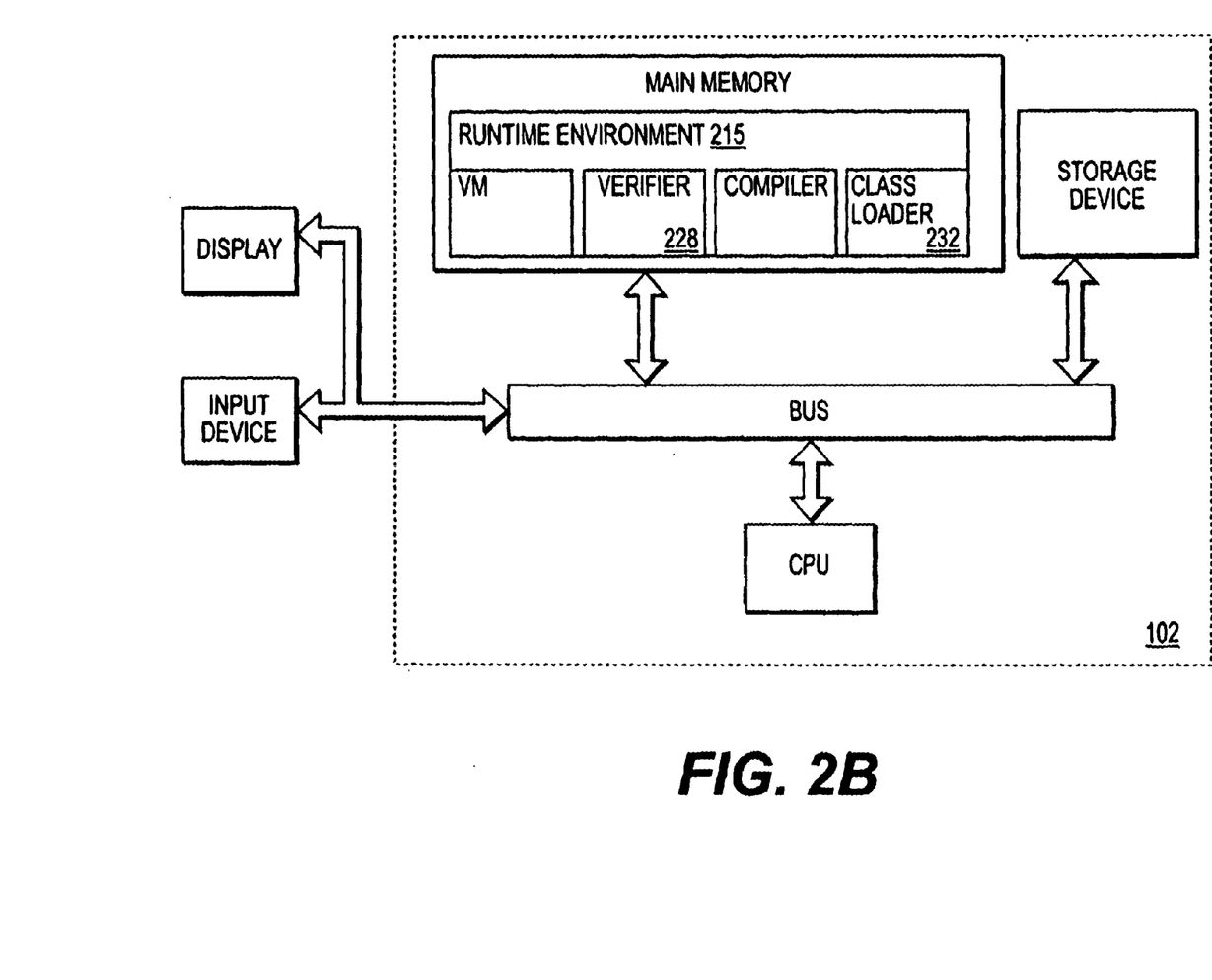

FIG. 2B further details components on a client computer 102 consistent with the present invention. The client computer system may also comprise several of the same components as the server computer system such as a CPU, a memory, an input device and a display device. The memory of the client computer 102 contains a runtime environment 215, such as a Java runtime environment, which further includes a class loader 232 which is used to load classes such as an archive file 230 containing the files of a Java applet. The runtime environment 215 further includes a verifier 228 which is used to verify the classes received by the class loader 232. The verifier 228 checks for receipt of classes of the applet 220 or for sufficient links or references to those classes.

Figure 3:
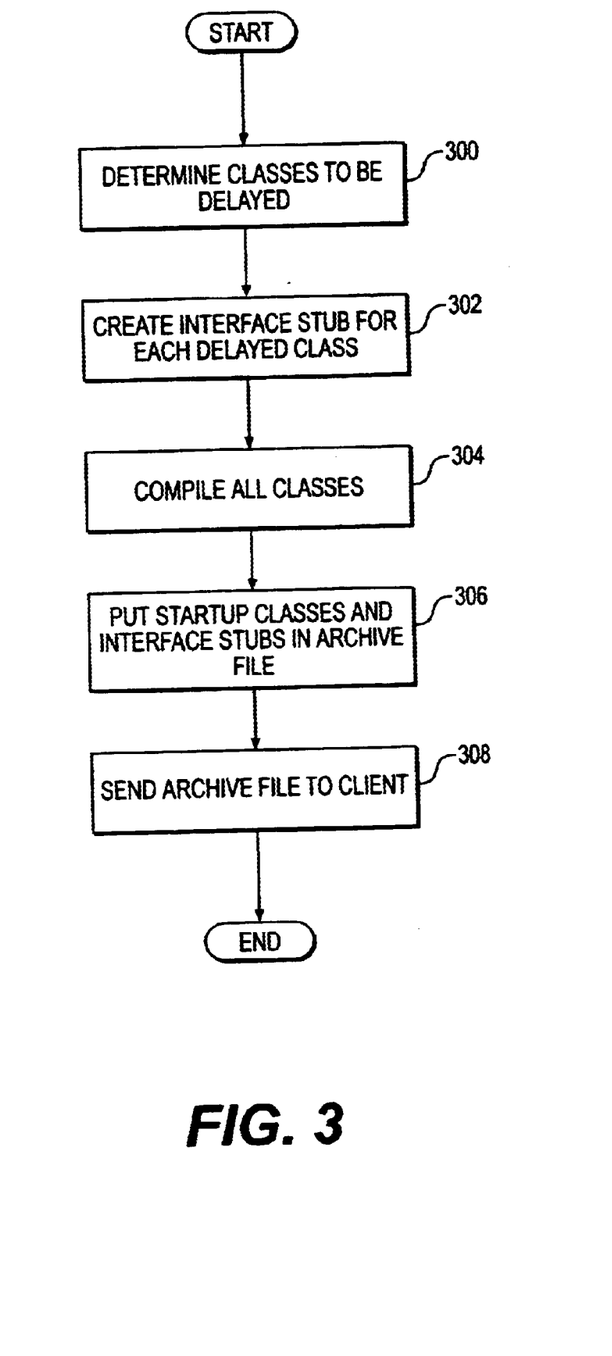
FIG. 3 is a flowchart illustrating the steps used by methods in accordance with the present invention to create and send an applet to a client computer.

FIG. 3 shows a flowchart illustrating the steps used by methods in accordance with the present invention to create and send an archive file 230 from server computer 100 to client computer 102. First, server computer 100 determines which classes 222 are to be delayed (step 300). For example, if an applet 220 to be sent to a client computer 102 contains three screens, and typically only the first screen is viewed by users, it may be determined that the classes for the second two screens will be delayed.

When the classes 222 to be delayed are determined, an interface stub 226 is created for each delayed class (step 302). In one implementation, a Java™ interface, as described in the "Java Language Specification" previously cited, is created that specifies the public methods and variables needed by the verifier 228 to complete verification of the applet 220. For example, an interface 'foo' may be created:

```
public interface foo {
    public abstract void bar ( );
}
```

The delayed class 222 is the associated implementation class which provides the actual implementation of the Java™ interface (the list of methods and variables of the delayed class 222). The delayed class resides on the server computer 100 and contains an initialize method, discussed below, that is used to pass parameters when it is called from the client computer 102. For example, an implementation class (delayed class 222) of the interface 'foo' above may be as follows:

```
public class fooImpl implements foo {
    public void bar ( ) {
        / perform function
    }
}
```

In this example, in the start-up classes of the applet received by the client computer, all references to the implementation class (delay class 222) 'fooLmpl' should be through the interface 'foo'. For example:

```
public class driver {
    public foo FooInstance;
}
```

These interface stubs 226 allow the verifier 228 to verify the entire applet 220 without actually loading the delayed classes 222, thereby saving memory space and loading time due to smaller size. Referring back to the previous example, if three screens are contained in an applet 220, and only the first is typically used by client computers 102, the other two screens may be delayed to be called later in the event that they are needed. If these interface stubs 226 were not put into the archive file 230 sent to the client computer, and if the classes 224 for the first screen referenced the other two screens, the verifier 228 would determine that the classes 222 for the other two screens are not contained in the archive file 230. The verifier 228 would then attempt to download them from the server computer 100, thereby defeating the time saving advantage of not initially loading them in the first place. The interface stubs 226 allow the verifier 228 to run through even if the classes 222 for the second two screens are still on the server computer 100.

After the creation of the interface stubs 226, the Java compiler 218 compiles all of the classes (step 304). Then, in one implementation consistent with the present invention, the start-up classes 224 and interface stubs 226 are put into an archive file 230 (step 306). The server computer 100 then sends the archive file 230 to the client computer 102 across an HTTP connection, for example.

Figure 4:
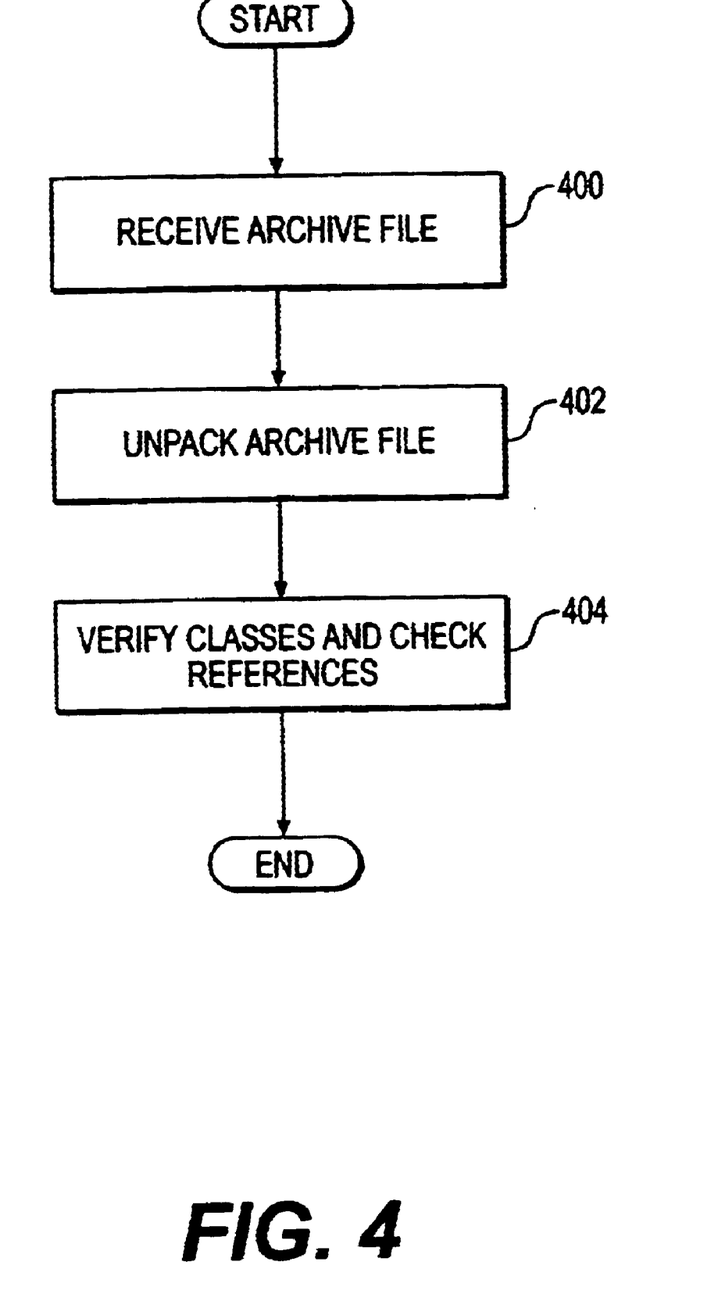
FIG. 4 is a flowchart illustrating the steps used by methods in accordance with the present invention to receive an applet sent by a server computer to a client computer.

FIG. 4 is a flowchart illustrating the steps used by a client computer 102 to receive an archive file 230 in accordance with the present invention. When a server computer 100 sends the archive file 230 to the client computer 102, the client computer receives the archive file 230 into the Java™ runtime environment 215 via the class loader 232 (step 400). Once the archive file 230 is loaded, the Java runtime environment 215 unpacks the archive file 230 to access the individual class files, namely the start-up classes 224 and interface stubs 226 (step 402). Finally, the verifier 228 verifies the classes and checks the references to other classes (step 404). For instance, if there is a start-up class 224 that has references to another delayed class 222, the verifier 228 will find the interface stub 226 for the class. After finding the interface stub 226, the verifier 228 verifies it and continues to check the rest of the classes received in the archive file 230.

Figure 5:
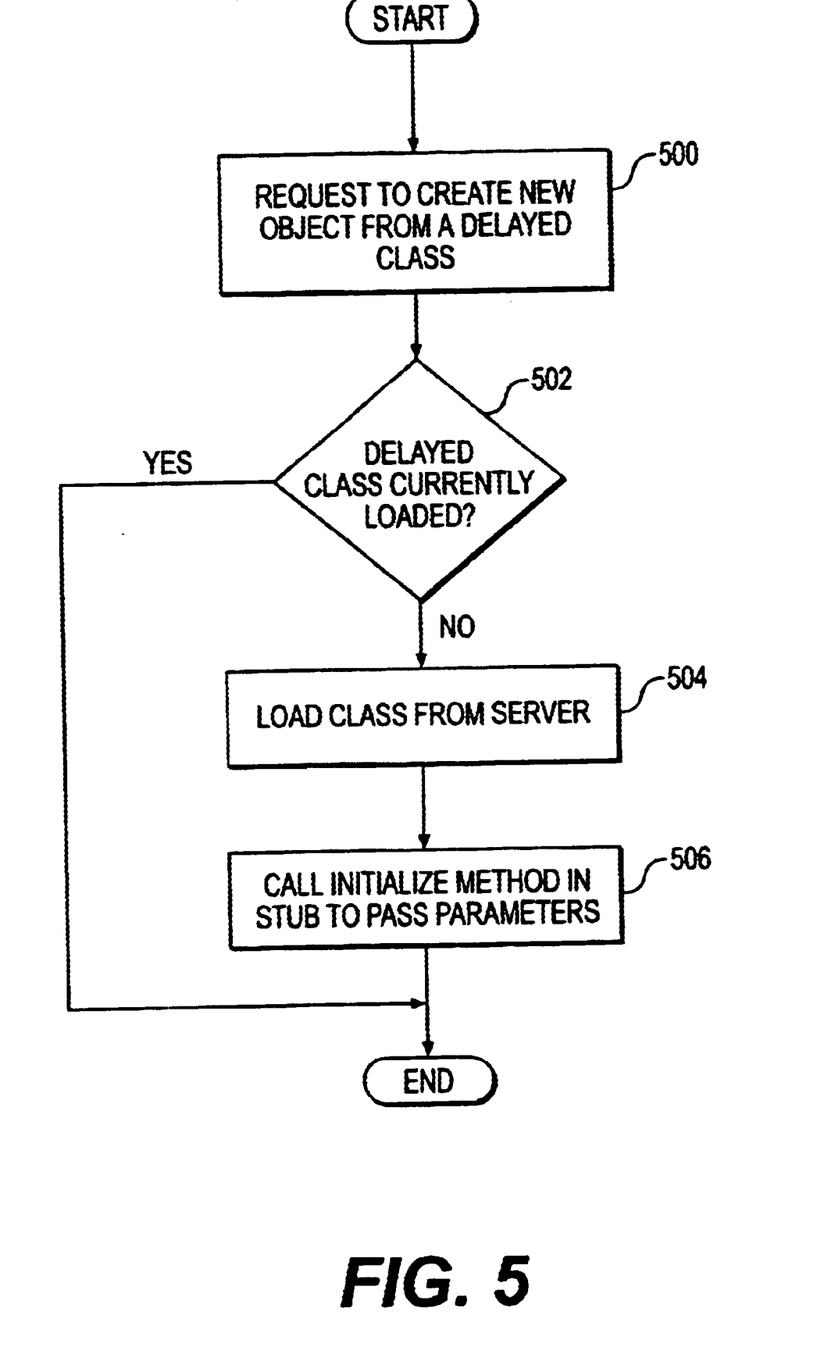
FIG. 5 is a flowchart illustrating the steps used by methods in accordance with present invention to run a received applet on a client computer.

FIG. 5 is a flowchart illustrating the steps used by methods in accordance with the present invention to run the received applet 220 on a client computer 102. During the running of the applet 220 by the client computer 102, the applet may need to create a new object from a delayed class residing on the server computer 100 (step 500). In this case, it is first determined whether the delayed class 222 has already been loaded into the client computer 102 (step 502). If not, the class loader 232 loads the class 222 from the server computer 100 (step 504).

In one embodiment consistent with the present invention, when a delayed class 222 is required in the code of the received Java applet 220, the Class.forName ( ) method in the Java programming language is used to request that the class be loaded from the server computer 100. In the Java programming language, when the Class.forName ( ) method is called on a class that is not in memory 204, the class loader 232 loads that class from the server computer 100. As an example (using classes from the previous example):

FooInstance=(foo) (Class.forName (fooImpl)) newInstance ( );

Normally, when a new object is created, arguments can be passed to the constructor of that object. However, the Class.forName ( ) method does not allow any arguments to be passed to a class's constructor. As a result, once a class 222 is loaded, the class's initialize method is called to pass arguments that would have been passed in the class's constructor.

In summary, methods and systems consistent with the present invention thus reduce the size of an applet and the time delay associated with sending an applet from a server computer to a client computer. They provide a way for the non-essential classes to be delayed and loaded only when necessary, and the delaying of classes greatly improves download performance.

The foregoing description of an implementation of the present invention has been presented for purposes of illustration and description. It is not exhaustive and does not limit the invention to the precise form disclosed. Modifications and variations are possible in light of the above teaching or may be acquired from practicing of the invention. The scope of the invention is defined by the claims and their equivalents.

What is claimed is:

1. A method in a data processing system for sending an applet from a server computer to a client computer, comprising the steps of:

receiving a first class to be delayed on the server computer, the first class being unnecessary for start-up of the applet;

receiving an interface class for the first class, wherein the interface class provides sufficient information to resolve references found in the first class;

creating on the server computer an archive file that represents the applet and that contains the interface class; and sending the archive file from the server computer to the client computer such that the client computer uses the interface class to resolve the references to the first class when starting the applet.

2. The method of claim 1, wherein the determining step includes:

receiving more than one class to be delayed, and wherein the step of receiving an interface class includes:
creating an interface class for each delayed class.

3. The method of claim 1, wherein the first class contains implementation code, and wherein the interface class lacks the implementation code to facilitate the sending of the archive file.

4. The method of claim 1, wherein the step of creating an archive file further comprises the step of:

creating an archive file on the server computer comprising the interface class and a second class, the second class being necessary for initialization of the applet on the client computer.

5. A method in a data processing system for receiving an applet by a client computer from a server computer, comprising the steps of:

receiving, by the client computer, an archive file containing a first class and an interface class associated with a second class;

executing the first class on the client computer;

determining whether the second class is needed by the client computer;

determining, by the client computer, whether the second class associated with the interface class is located on the client computer when it is determined that the second class is needed; and retrieving the second class from the server computer when it is determined that the second class is not located on the client computer and when it is determined that the second class is needed by the client computer.

6. A computer-readable medium containing instructions for controlling a data processing system to perform a method for sending an applet from a server computer to a client computer, the method comprising:

receiving a first class to be delayed on the server computer, the first class being unnecessary for start-up of the applet;

receiving an interface class for the first class, wherein the interface class provides sufficient information to resolve references found in the first class;

creating on the server computer an archive file that represents the applet and that contains the interface class; and sending the archive file from the server computer to the client computer such that the client computer uses the interface class to resolve the references to the first class when starting the applet.

7. The computer readable medium of claim 6, wherein the determining step includes:

receiving more than one class to be delayed, and wherein the step of receiving an interface class includes:
creating an interface class for each delayed class.

8. The computer readable medium of claim 6, wherein the first class contains implementation code, and wherein the interface class lacks the implementation code to facilitate the sending of the archive file.

9. The computer readable medium of claim 6, wherein the step of creating an archive file further comprises the step of:

creating an archive file on the server computer comprising the interface class and a second class, the second class being necessary for initialization of the applet on the client computer.

10. A computer-readable medium containing instructions for controlling a data processing system to perform a method for receiving an applet from a server computer to a client computer, the method comprising:

receiving, by the client computer, an archive file containing a first class and an interface class associated with a second class;

executing the first class on the client computer;

determining whether the second class is needed by the client computer;

determining, by the client computer, whether the second class associated with the interface class is located on the client computer when it is determined that the second class is needed; and retrieving the second class from the server computer if it is determined that the second class is not located on the client computer and it is determined that the second class is needed by the client computer.

11. A method in a data processing system for sending an applet from a server computer and receiving the applet by a client computer, comprising the steps of:

receiving a first class to be delayed on the server computer, the first class being unnecessary for start-up of the applet and lacking implementation code to reduce an amount of time required for sending the applet from the server computer to the client computer;

receiving on the server computer an interface class for the delayed first class, wherein the interface class provides sufficient information to resolve references found in the first class;

creating an archive file on the server computer comprising the interface class and a second class, the archive file representing the applet, the second class being necessary for initialization of the applet on the client computer and containing implementation code;

sending the archive file from the server computer to the client computer;

receiving the archive file by the client computer;

running the applet on the client computer such that the client computer uses the interface class to resolve the references to the first class; and while the applet is running on the client computer,
determining whether the first class is needed by the client computer;
determining, by the client computer, whether the first class is located on the client computer when it is determined that the first class is needed; and
retrieving the first class from the server computer when it is determined that the first class is not located on the client computer and when it is determined that the first class is needed by the client computer.

12. A data processing system comprising:

a server computer and a client computer, the server computer having a memory containing a first class to be delayed on the server computer and an archive file comprising an interface class for the delayed first class, the first class being unnecessary for startup of the applet on the client computer, the interface class providing sufficient information to resolve references found in the first class, the server computer having a processor for sending the archive file to the client computer, the client computer having a memory containing a web browser for receiving the archive file from the server computer and verification code for using the received interface class to resolve references to the first class, and having a processor for accessing the delayed first class using the received interface class when it is determined that the first class is needed by the client computer.

13. A system for sending an applet from a server computer to a client computer, comprising:

means for receiving a first class to be delayed on the server computer, the first class being unnecessary for start-up of the applet;

means for receiving an interface class for the first class, wherein the interface class provides sufficient information to resolve references found in the first class;

means for creating on the server computer an archive file that represents the applet and that contains the interface class; and means for sending the archive file from the server computer to the client computer such that the client computer uses the interface class to resolve the references to the first class when starting the applet.

* * * * *

UNITED STATES PATENT AND TRADEMARK OFFICE
CERTIFICATE OF CORRECTION

PATENT NO. : 6,636,885 B1
DATED : October 21, 2003
INVENTOR(S) : Guy Martin It is certified that error appears in the above-identified patent and that said Letters Patent is hereby corrected as shown below:

<u>Title page,</u>
Item [57], ABSTRACT,
Line 2, "unnecessary the" should read -- unnecessary to the --; and
Line 7, "classes This" should read -- classes. This --.

Signed and Sealed this

Thirtieth Day of December, 2003

JAMES E. ROGAN
*Director of the United States Patent and Trademark Office*